United States Patent
Schofield et al.

(10) Patent No.: US 11,248,534 B2
(45) Date of Patent: Feb. 15, 2022

(54) SYSTEM AND METHOD FOR ENGINE EDUCTOR POWERED BY ALTERNATE MANAGED AIR SYSTEM

(71) Applicant: General Electric Company, Schenectady, NY (US)

(72) Inventors: Ronald Bruce Schofield, Clarksville, OH (US); Kinga Lucja Rybinska, Warsaw (PL); Thomas Charles McCarthy, Boston, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 629 days.

(21) Appl. No.: 15/892,337

(22) Filed: Feb. 8, 2018

(65) Prior Publication Data
US 2020/0158024 A1 May 21, 2020
US 2021/0095600 A9 Apr. 1, 2021

(30) Foreign Application Priority Data
Mar. 30, 2017 (PL) .......................................... 421044

(51) Int. Cl.
*F02C 9/18* (2006.01)
*F02C 6/08* (2006.01)
(Continued)

(52) U.S. Cl.
CPC .................. *F02C 9/18* (2013.01); *F02C 6/08* (2013.01); *F02C 7/06* (2013.01); *F02C 9/24* (2013.01);
(Continued)

(58) Field of Classification Search
CPC ...... F02C 9/18; F02C 7/06; F02C 7/08; F02C 7/28; F05D 2260/601; F05D 2260/608;
(Continued)

(56) References Cited

U.S. PATENT DOCUMENTS 3,722,624 A * 3/1973 Buckland .............. F01D 25/183
184/6.11
3,906,717 A 9/1975 Matthews
(Continued)

FOREIGN PATENT DOCUMENTS

CA 887378 A 12/1971
CN 101041385 A 9/2007
(Continued)

OTHER PUBLICATIONS

PL Search Report dated Oct. 6, 2017 which was issued in connection with PL Patent Application No. P-421044 which was filed on Mar. 30, 2017.
(Continued)

*Primary Examiner* — Alain Chau
(74) *Attorney, Agent, or Firm* — Venable LLP; Michele V. Frank (57) ABSTRACT

A ventilation system includes a cavity, a fluid motive force device, and a motive fluid supply system. The cavity includes different ventilation level requirements for a plurality of modes of operation. The fluid motive force device includes a suction port, an outlet port, and a motive fluid inlet port. The suction port is coupled in flow communication with the cavity to be vented. A flow supply to the motive fluid inlet port determines a ventilation flow through the suction port. The motive fluid supply system is coupled in flow communication with the motive fluid inlet port. An operation of the motive fluid supply system determines a flow of motive fluid from the motive fluid supply system to the motive fluid inlet port. The flow of motive fluid to the motive fluid inlet port generates a ventilation flow through the suction port approximately matching a current ventilation demand of said cavity.

20 Claims, 4 Drawing Sheets

(51) Int. Cl.
  *F02C 7/06* (2006.01)
  *F02C 9/24* (2006.01)
(52) U.S. Cl.
  CPC ...... *F05D 2220/32* (2013.01); *F05D 2240/50* (2013.01); *F05D 2240/60* (2013.01); *F05D 2260/601* (2013.01); *F05D 2260/605* (2013.01); *F05D 2260/608* (2013.01); *Y02T 50/60* (2013.01)
(58) Field of Classification Search
  CPC ............ F05D 2260/98; F05D 2240/50; F05D 2240/60; F01D 25/125; F01D 25/16; F01D 25/18; F01M 1/12; F16N 7/40; F16C 33/6659; F16C 33/6662; F16C 33/6685; F16C 33/762
  See application file for complete search history.

(56) References Cited

U.S. PATENT DOCUMENTS

| | | | | |
|---|---|---|---|---|
| 4,213,307 | A * | 7/1980 | Watson | F25B 31/004 62/192 |
| 5,063,963 | A * | 11/1991 | Smith | F02C 9/16 137/606 |
| 5,161,364 | A * | 11/1992 | Bruun | F02C 7/14 60/772 |
| 5,429,208 | A * | 7/1995 | Largillier | F01D 25/20 184/6.11 |
| 5,611,661 | A * | 3/1997 | Jenkinson | F01D 25/183 184/6.11 |
| 6,305,156 | B1 * | 10/2001 | Lui | B64D 13/06 60/785 |
| 6,470,666 | B1 | 10/2002 | Przytulski et al. | |
| 7,584,619 | B2 * | 9/2009 | Granitz | F01D 25/20 60/785 |
| 7,836,675 | B2 | 11/2010 | Corattiyil et al. | |
| 7,931,124 | B2 | 4/2011 | Glahn et al. | |
| 8,245,818 | B2 * | 8/2012 | Alecu | F01D 25/18 184/11.2 |
| 8,956,106 | B2 * | 2/2015 | Fang | F02C 7/06 415/117 |
| 9,212,757 | B2 * | 12/2015 | Rossi | F01D 25/18 |
| 10,138,812 | B2 * | 11/2018 | Heaton | F01D 25/162 |
| 2007/0220899 | A1 | 9/2007 | Earith Thomas et al. | |
| 2009/0025662 | A1 * | 1/2009 | Herman | F01M 13/04 123/41.86 |
| 2009/0288384 | A1 * | 11/2009 | Granitz | F01D 25/20 60/39.08 |
| 2010/0092116 | A1 * | 4/2010 | Franconi | F01D 25/183 384/317 |
| 2010/0192593 | A1 * | 8/2010 | Brown | F02C 6/08 60/782 |
| 2013/0156547 | A1 * | 6/2013 | Fang | F01D 25/183 415/111 |
| 2013/0177406 | A1 * | 7/2013 | Heaton | F01D 25/183 415/176 |
| 2013/0192252 | A1 * | 8/2013 | Ackermann | F02C 7/06 60/782 |
| 2014/0034146 | A1 * | 2/2014 | Rossi | F01D 25/18 137/81.1 |
| 2016/0009399 | A1 * | 1/2016 | Schwarz | F02C 6/08 415/116 |
| 2016/0084111 | A1 | 3/2016 | Bei et al. | |
| 2016/0222986 | A1 * | 8/2016 | Mason | F04F 5/54 |

FOREIGN PATENT DOCUMENTS

| | | |
|---|---|---|
| CN | 102829001 A | 8/2012 |
| CN | 105909386 A | 8/2016 |
| CN | 106693876 A | 5/2017 |
| EP | 1316678 A2 | 6/2003 |
| EP | 3050802 A1 | 8/2016 |
| GB | 2493835 A | 2/2013 |

OTHER PUBLICATIONS

Chinese Office Action Corresponding to Application No. 201810279315 dated Mar. 11, 2020.

* cited by examiner

SYSTEM AND METHOD FOR ENGINE EDUCTOR POWERED BY ALTERNATE MANAGED AIR SYSTEM

BACKGROUND OF THE INVENTION

The field of the disclosure relates generally to gas turbine engines and, more particularly, to a system and method for powering an eductor in gas turbine engines.

At least some known gas turbine engines include a low pressure compressor rotatably coupled to a low pressure turbine through a shaft. Typically, the shaft is supported by one or more bearings. Sumps or regions around the bearings are typically vented to prevent oil and other fluids from entering other portions of the engine. The sump is constantly venting during operation of the gas turbine engine. However, during some operational modes, the sump needs help venting. An eductor typically helps vent the sump by channeling a fast moving fluid past a nozzle coupled in flow communication with the sump. The Venturi effect causes a drop in pressure at the tip of the nozzle and draws the air out of the sump, through the nozzle where it mixes with the fast moving fluid, and out of the eductor. However, the sump does not require constant forced venting. As such, the flow of fast moving fluid to the eductor is regulated by a valve and other corresponding valve equipment. The valve and other corresponding valve equipment add weight to the engine.

SUMMARY OF THE INVENTION

In one aspect, a ventilation system is provided. The ventilation system includes a cavity to be vented, a fluid motive force device, and a motive fluid supply system. The cavity includes different ventilation level requirements for each of a plurality of respective modes of operation. The fluid motive force device includes a suction port, an outlet port, and a motive fluid inlet port. The suction port is coupled in flow communication with the cavity to be vented. A flow supply to the motive fluid inlet port determines a ventilation flow through the suction port. The motive fluid supply system is coupled in flow communication with the motive fluid inlet port. An operation of the motive fluid supply system determines a flow of motive fluid from the motive fluid supply system to the motive fluid inlet port. The flow of motive fluid to the motive fluid inlet port generates a ventilation flow through the suction port approximately matching a current ventilation demand of said cavity.

In another aspect, a gas turbine engine is provided. The gas turbine engine includes a core engine including a compressor, a combustor, and a turbine in a serial flow arrangement. The gas turbine engine further includes a low pressure compressor coupled to a low pressure turbine by a shaft. The gas turbine engine also includes a sump, a ventilation system, and a bearing supporting the shaft. The sump at least partially surrounds the bearing. The ventilation system includes a cavity to be vented, a fluid motive force device, and a motive fluid supply system. The cavity includes different ventilation level requirements for each of a plurality of respective modes of operation. The fluid motive force device includes a suction port, an outlet port, and a motive fluid inlet port. The suction port is coupled in flow communication with the cavity to be vented. A flow supply to the motive fluid inlet port determines a ventilation flow through the suction port. The motive fluid supply system is coupled in flow communication with the motive fluid inlet port. An operation of the motive fluid supply system determines a flow of motive fluid from the motive fluid supply system to the motive fluid inlet port. The flow of motive fluid to the motive fluid inlet port generates a ventilation flow through the suction port approximately matching a current ventilation demand of said cavity.

In yet another aspect, method of venting a cavity is provided. The method includes channeling a first flow of a motive fluid to an eductor inlet port. The first flow determined by an operation of a motive fluid supply system. The method also includes generating a suction flow through a suction port of the eductor based on the first flow. The method further includes ventilating a cavity using the suction flow, the suction flow substantially matching a demand for ventilation by the cavity.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1-4 show example embodiments of the method and apparatus described herein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the ventilation system described herein ventilate a cavity of a gas turbine engine, for example, the sump of a gas turbine engine. The sump is constantly ventilating but needs help ventilating during some operational modes. The ventilation system includes a fluid motive force device or eductor configured to ventilate the sump. The eductor vents the sump by channeling a fast moving motive fluid past a nozzle coupled in flow communication with the sump. The motive fluid is supplied by a motive fluid supply system or air management system (hereinafter "AMS") which also supplies the motive fluid to other systems. The sump ventilation demand and AMS demand varies with the operation of the gas turbine engine. In the exemplary embodiment, the sump ventilation demand coincides with the AMS demand. That is, the AMS increases supply of the motive fluid at the same time the ventilation system requires an increased supply of the motive fluid. As such, the eductor is coupled to the AMS without a regulation device or a valve to regulate the flow of motive fluid to the eductor because the operational modes of the AMS and the ventilation system coincide. Coupling the eductor to the AMS eliminates the need for a valve to regulate the flow of motive fluid to the eductor. Eliminating a valve reduces the weight of the gas turbine engine.

Figure 1:
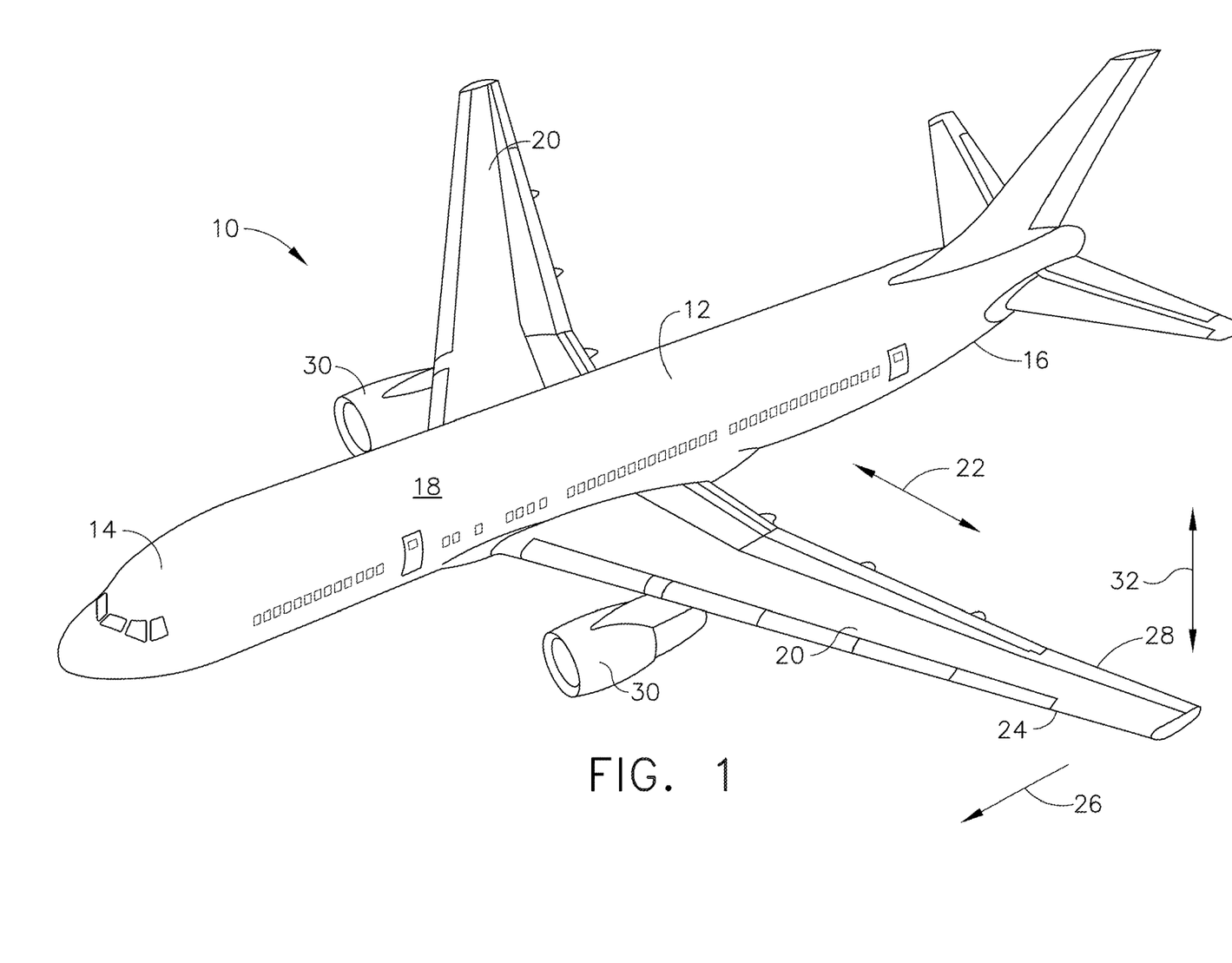
FIG. 1 is a perspective view of an aircraft.

FIG. 1 is a perspective view of an aircraft 10. In the example embodiment, aircraft 10 includes a fuselage 12 that includes a nose 14, a tail 16, and a hollow, elongate body 18 extending therebetween. Aircraft 10 also includes a wing 20 extending away from fuselage 12 in a lateral direction 22. Wing 20 includes a forward leading edge 24 in a direction 26 of motion of aircraft 10 during normal flight and an aft trailing edge 28 on an opposing edge of wing 20. Aircraft 10 further includes at least one engine 30 configured to drive a bladed rotatable member or fan to generate thrust. Engine 30 is coupled to at least one of wing 20 and fuselage 12, for example, in a pusher configuration (not shown) proximate tail 16. In the exemplary embodiment, engine 30 is coupled to wing 20 below wing 20 in a vertical direction 32. Vertical direction 32 is defined relative to the direction aircraft 10 is oriented when stationary on the ground. Down, vertically lower, or below refers to the side of aircraft 10 facing the ground when aircraft 10 has weight on wheels. Up, vertically upper, or above refers to the side of aircraft 10 opposite down, vertically lower, or below. Engine 30 is not limited to wing-mount engines as depicted in FIG. 1. Engine 30 may also include engines installed over wing 20, engines installed to fuselage 12, or engines installed within fuselage 12.

Figure 2:
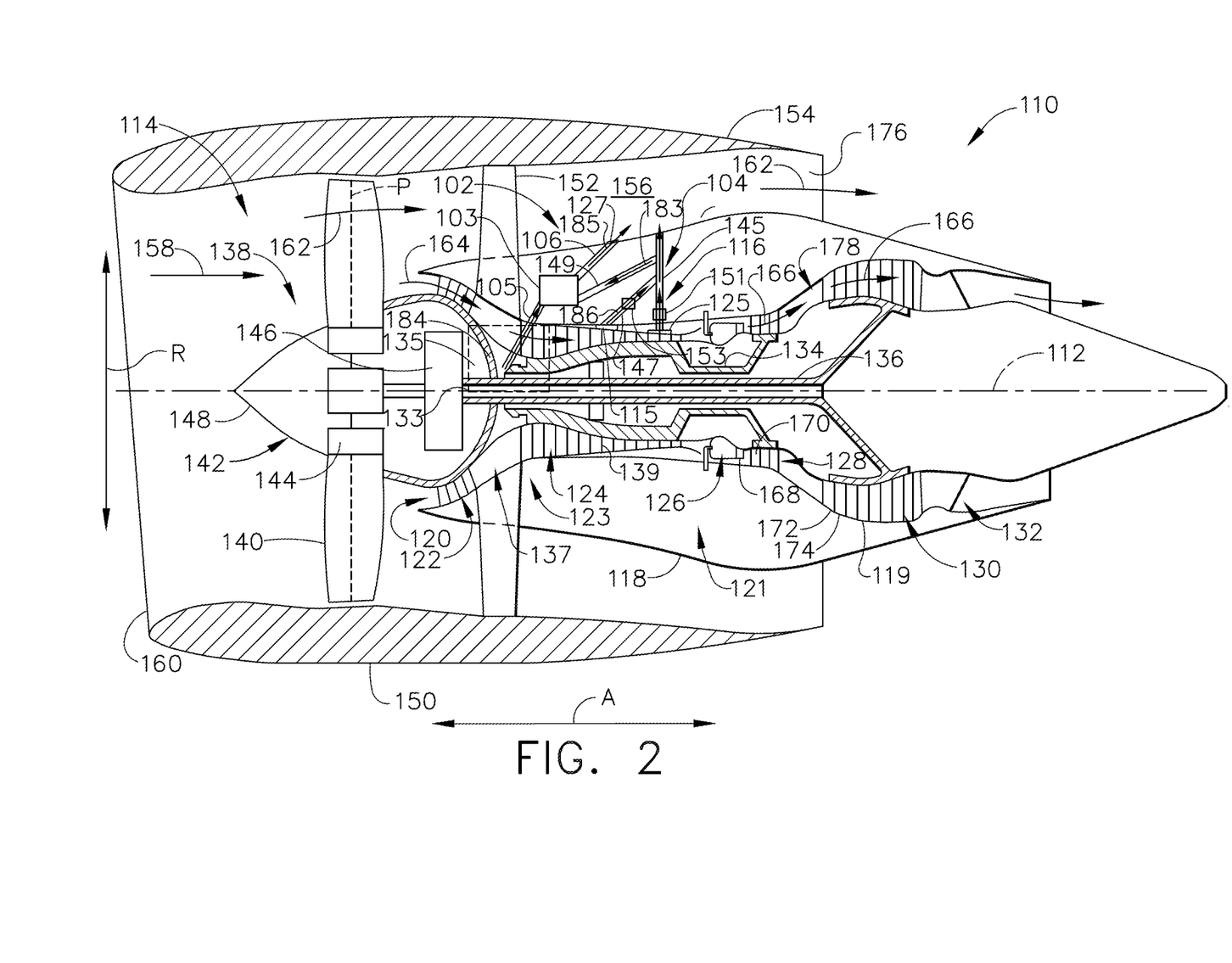
FIG. 2 is a schematic view of a gas turbine engine.
Figure 3:
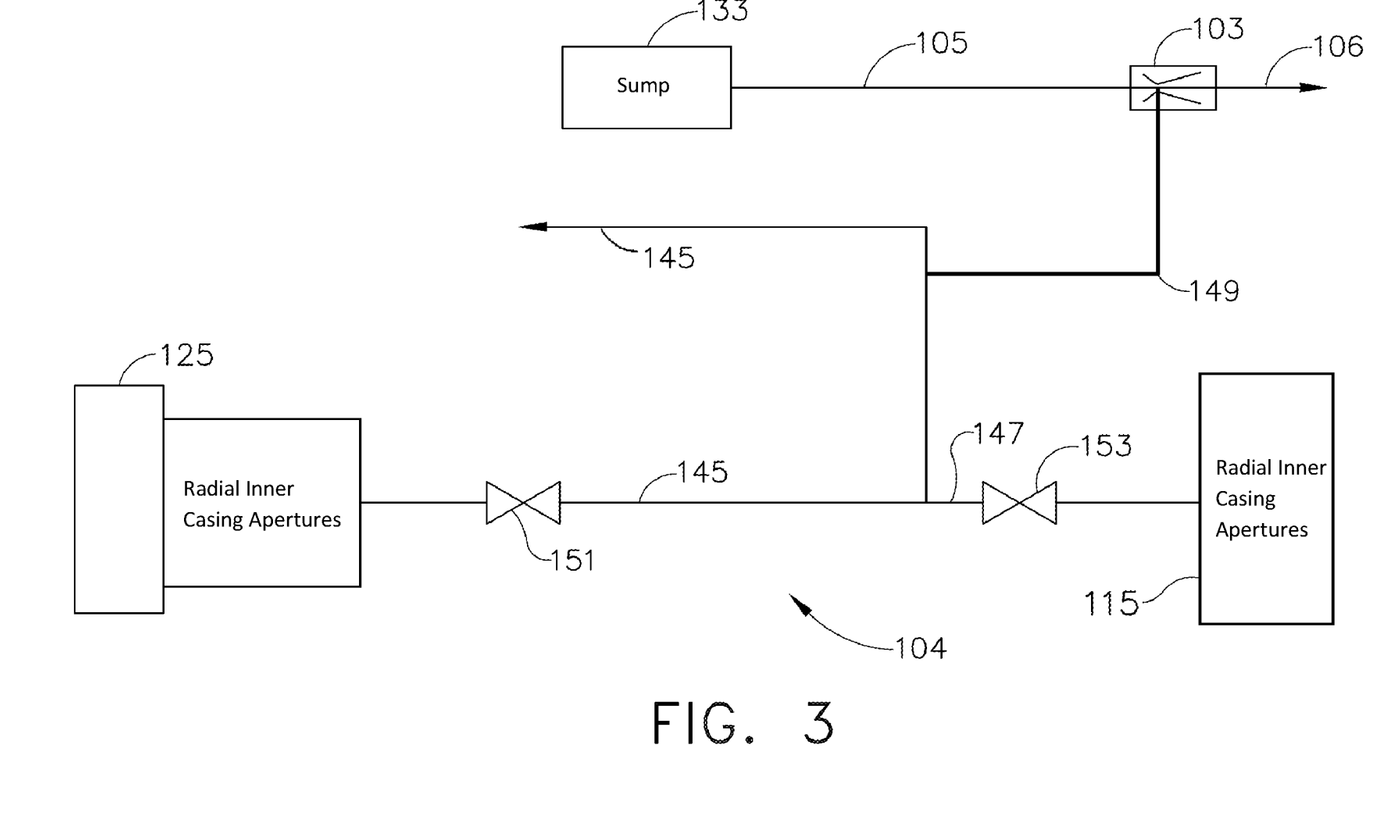
FIG. 3 is a schematic diagram of a ventilation system in accordance with an exemplary embodiment of the present disclosure.

FIG. 2 is a schematic cross-sectional view of a gas turbine engine 110 in accordance with an exemplary embodiment of the present disclosure. FIG. 3 is a schematic diagram of a ventilation system 102 in accordance with an exemplary embodiment of the present disclosure. In the exemplary embodiment, gas turbine engine 110 is a high-bypass turbofan jet engine 110, referred to herein as "turbofan engine 110." Gas turbine engine 110 is not limited to high bypass turbofan engines. As shown in FIG. 2, turbofan engine 110 defines an axial direction A (extending parallel to a longitudinal centerline 112 provided for reference) and a radial direction R. In general, turbofan engine 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 and an inner casing 119 encases, in serial flow relationship, a compressor section 123 including a booster or low pressure (LP) compressor 122 and a high pressure (HP) compressor 124; a combustion section 126; a turbine section 117 including a high pressure (HP) turbine 128 and a low pressure (LP) turbine 130; and a jet exhaust nozzle section 132. The volume between outer casing 118 and inner casing 119 forms a plurality of cavities or undercowl spaces 121. A high pressure (HP) shaft or spool 134 drivingly connects HP turbine 128 to HP compressor 124. A low pressure (LP) shaft or spool 136 drivingly connects LP turbine 130 to LP compressor 122. A bearing 135 disposed within a sump 133 supports LP shaft 136. Sump 133 is a chamber which supports rotor bearings. In the exemplary embodiment, sump 133 includes "A" sump within a typical gas turbine engine. However, sump 133 includes any sump within a gas turbine engine. Compressor section 123, combustion section 126, turbine section 117, and nozzle section 132 together define a core air flowpath 137. HP compressor 124 includes a plurality of HP compressor blades 139 configured to increase the pressure of a flow of air. Inner casing 119 defines a plurality of radia inner casing apertures 115 and 125. Outer casing 118 defines a plurality of radia outer casing apertures 127. In the exemplary embodiment, radia inner casing apertures 115 include fourth stage compressor bleed ports, radia inner casing apertures 125 include tenth stage compressor bleed ports, and radia outer casing apertures 127 include transient bleed valves.

As shown in FIG. 2, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes a plurality of gears for adjusting the rotational speed of fan 138 relative to LP shaft 136 to a more efficient rotational fan speed. Fan 138 is not limited to a variable pitch fan as depicted in FIG. 2. Fan 138 may also include fixed pitch fans. In another embodiment, gas turbine engine 110 does not include power gear box 146. Rather, fan 138 is coupled directly to LP shaft 136.

Also, in the exemplary embodiment, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. Nacelle 150 is configured to be supported relative to core turbine engine 116 by a plurality of circumferentially-spaced outlet guide vanes 152. A downstream section 154 of nacelle 150 extends over an outer portion of core turbine engine 116 so as to define a bypass airflow passage 156 therebetween.

As shown in FIGS. 2-3, ventilation system 102 includes a fluid motive force device or eductor 103 and a motive fluid supply system 104. In the exemplary embodiment, fluid motive force device 103 includes an eductor. However, fluid motive force device 103 includes any device configured to transport fluid which enables ventilation system 102 to operate as describe herein. Eductor 103 is coupled in flow communication with sump 133, radia outer casing apertures 127, and motive fluid supply system 104. Eductor 103 is coupled in flow communication with sump 133 by a sump conduit 105. Eductor 103 is coupled in flow communication with radia outer casing apertures 127 by a ventilation conduit 106. Eductor 103 is coupled in flow communication with motive fluid supply system 104 by a motive fluid supply conduit 107.

In the exemplary embodiment, motive fluid supply system 104 includes an air management system (AMS) configured to provide air-conditioned air to fuselage 12. However, motive fluid supply system 104 includes any system configured to supply a motive fluid. Motive fluid supply system 104 includes a tenth stage motive fluid supply conduit 145, a fourth stage motive fluid supply conduit 147, and an eductor motive fluid supply conduit 149. Tenth stage motive fluid supply conduit 145 is coupled in flow communication with radia inner casing apertures 125 and with an air distribution system (not shown) within fuselage 12. Tenth stage motive fluid supply conduit 145 includes a first valve 151 configured to regulate the flow of a motive fluid from radia inner casing apertures 125. Fourth stage motive fluid supply conduit 147 is coupled in flow communication with radia inner casing apertures 115 and with tenth stage motive fluid supply conduit 145. Fourth stage motive fluid supply conduit 147 includes a second valve 153 configured to regulate the flow of a motive fluid from radia inner casing apertures 115. Eductor motive fluid supply conduit 149 is coupled in flow communication with tenth stage motive fluid supply conduit 145 and eductor 103

During operation of turbofan engine 120, a volume of air 158 enters gas turbine engine 110 through an associated inlet 160 of nacelle 150. As volume of air 158 passes across fan blades 140, a first portion 162 of volume of air 158 is directed or routed into bypass airflow passage 156 and a second portion 164 of volume of air 158 is directed or routed into core air flowpath 137, or more specifically into LP compressor 122. A ratio between first portion 162 and second portion 164 is commonly referred to as a bypass ratio. The pressure of second portion 164 is then increased as it is routed through HP compressor 124 and into combustion section 126, where it is mixed with fuel and burned to provide combustion gases 166.

During operation of gas turbine engine 110, sump 133 is constantly ventilated through ventilation system 102 but needs help ventilating during some operational modes. During a first mode of operation, such as when gas turbine engine 110 is operating at a low speed or idle, ventilation system 102 requires an increased flow of motive fluid to increase ventilation. A portion 181 of second portion of air 164 is directed or routed into radia inner casing apertures 125 and into tenth stage motive fluid supply conduit 145. During the first mode of operation, valve 151 is configured in an open position while valve 153 is configured in a closed position. Tenth stage motive fluid supply conduit 145 channels portion of air 181 to an air distribution system (not shown) within fuselage 12 as indicated by arrow 182. A portion 183 of portion of air 181 is channeled into eductor motive fluid supply conduit 149 which channels portion of air 183 to eductor 103. Portion of air 183 is the motive fluid which lowers the pressure within eductor 103 such that air within sump 133 is channeled into sump conduit 105 as indicated by arrow 184. Sump air 184 mixes with portion of air 183 within eductor 103 and is channeled into bypass airflow passage 156 by ventilation conduit 106 as indicated by arrow 185.

During a second mode of operation, such as when gas turbine engine 110 is cruising, ventilation system 102 requires a decreased flow of motive fluid because ventilation system 102 does not require as much help ventilating sump 133. A portion 186 of second portion of air 164 is directed or routed into radia inner casing apertures 115 and into fourth stage motive fluid supply conduit 147. During the second mode of operation valve 151 is configured in a closed position while valve 153 is configured in an open position. Fourth stage motive fluid supply conduit 147 channels portion of air 186 to an air distribution system (not shown) within fuselage 12 as indicated by arrow 182. A portion 183 of portion of air 186 is channeled into eductor motive fluid supply conduit 149 which channels portion of air 183 to eductor 103. Portion of air 183 is the motive fluid which lowers the pressure within eductor 103 such that air within sump 133 is channeled into sump conduit 105 as indicated by arrow 184. Sump air 184 mixes with portion of air 183 within eductor 103 and is channeled into bypass airflow passage 156 by ventilation conduit 106 as indicated by arrow 185.

In the exemplary embodiment, sump 133 has a required amount of ventilation during first and second modes of operation. Similarly, AMS is required to provide a predetermined amount of air to fuselage 12 during first and second modes of operation. Eductor motive fluid supply conduit 149 does not include a valve or other flow regulation device to regulate the flow of portion of air 186 to eductor 103. As such, the flow of motive fluid and the motive force applied to sump air 184 varies with the flow of air to the AMS. In the exemplary embodiment, the required ventilation of sump 133 varies with the required air to AMS. That is, as the required flow of air to AMS decreases, the required amount of ventilation of sump 133 also decreases. Similarly, as the required flow of air to AMS increases, the required amount of ventilation of sump 133 also increases. Thus, while the required amount of ventilation of sump 133 varies independently of the required flow of air to AMS, in the exemplary embodiment, the required amount of ventilation of sump 133 varies in accordance with the required flow of air to AMS. As such, ventilation system 102 does not require dedicated equipment to regulate the flow of motive fluid to eductor 103 which reduces the weight of gas turbine engine 110 and increase the efficiency of gas turbine engine 110.

As shown in FIG. 2, combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate, thereby supporting operation of LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

Exemplary turbofan engine 110 depicted in FIG. 2 is by way of example only, and that in other embodiments, turbofan engine 110 may have any other suitable configuration. It should also be appreciated, that in still other embodiments, aspects of the present disclosure may be incorporated into any other suitable gas turbine engine. For example, in other embodiments, aspects of the present disclosure may be incorporated into, e.g., a turboprop engine.

Figure 4:
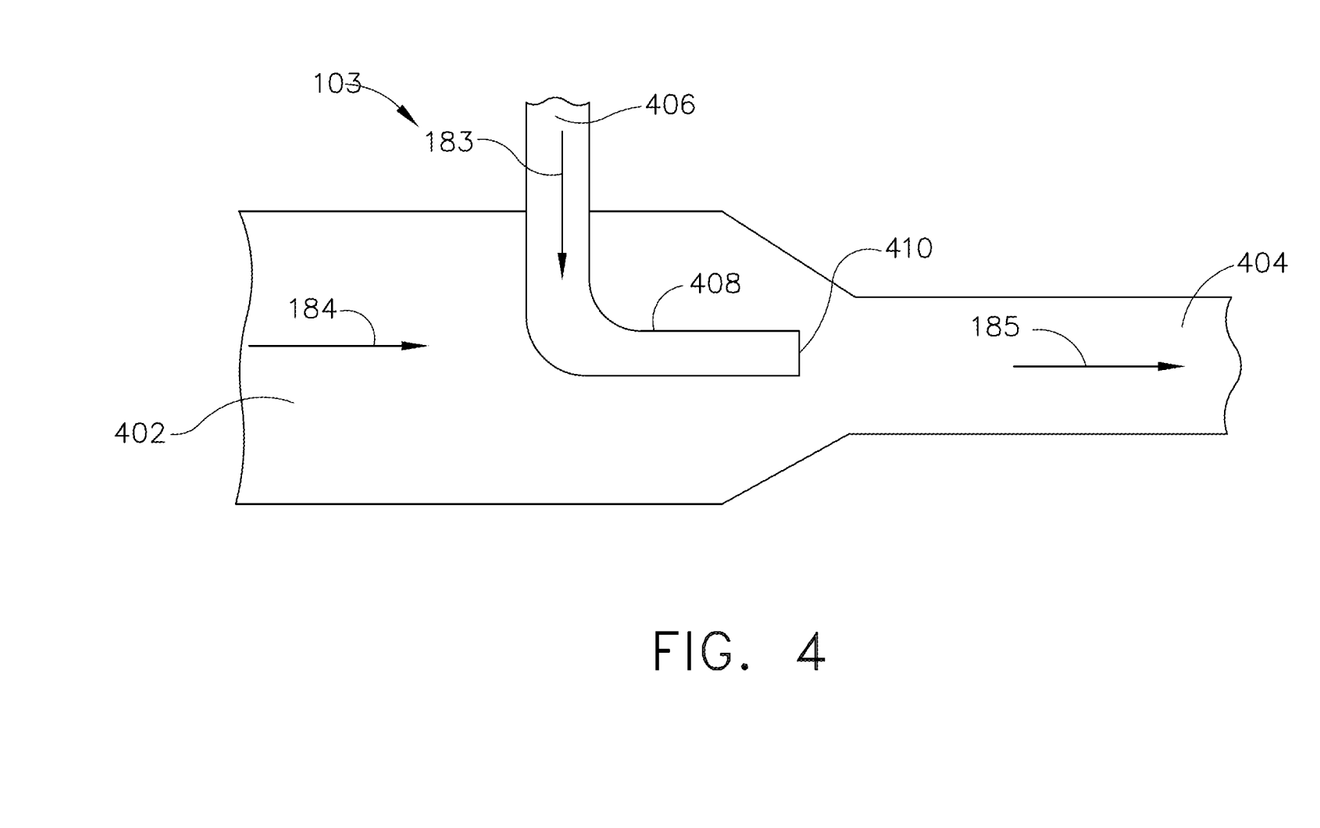
FIG. 4 is a schematic cross-sectional view of an eductor shown in FIGS. 2 and 3.

FIG. 4 is a schematic cross-sectional view of eductor 103 in accordance with an exemplary embodiment of the present disclosure. Eductor 103 includes a suction port 402, an outlet port 404, a motive fluid inlet port 406, and a nozzle 408. Motive fluid inlet port 406 and nozzle 408 are coupled in flow communication with eductor motive fluid supply conduit 149. Outlet port 404 is coupled in flow communication with ventilation conduit 106. Suction port 402 is coupled in flow communication with sump conduit 105. Nozzle 408 includes a tip 410.

During operation, portion of air 183 is channeled into motive fluid inlet port 406 by eductor motive fluid supply conduit 149. Portion of air 183 flows through tip 410 and the Venturi effect causes a drop in pressure in sump conduit 105 causing sump air 184 to enter sump conduit 105. Sump conduit 105 channels sump air 184 into suction port 402 and past nozzle 408. Sump air 184 mixes with portion of air 183. Sump air 184 and portion of air 183 is channeled into ventilation conduit 106 by outlet port 404 as indicated by arrow 185. Eductor 103 provides the motive force for sump air 184 without any moving parts.

The above-described ventilation system provides an efficient method for ventilating a cavity of a gas turbine engine. Specifically, ventilation system includes a fluid motive force device or eductor configured to ventilate the sump. The eductor vents the sump by channeling a fast moving motive fluid past a nozzle coupled in flow communication with the sump. The motive fluid is supplied by a motive fluid supply system or air management system (hereinafter "AMS") which supplies the motive fluid to other systems. The sump ventilation demand and AMS demand varies with the operation of the gas turbine engine. In the exemplary embodiment, the sump ventilation demand coincides with the AMS demand. As such, the eductor is coupled to the AMS without a regulation device or a valve to regulate the flow of motive fluid to the eductor. Coupling the eductor to the AMS eliminates the need for a valve to regulate the flow of motive fluid to the eductor. Eliminating a valve reduces the weight of the gas turbine engine and increases the efficiency of the gas turbine engine.

An exemplary technical effect of the methods, systems, and apparatus described herein includes at least one of: (a) ventilating a cavity of a gas turbine engine; (b) decreasing the complexity of a ventilation system in a gas turbine engine; (c) decreasing the weight of a gas turbine engine; and (d) increasing the efficiency of a gas turbine engine.

Exemplary embodiments of the ventilation system are described above in detail. The ventilation system, and methods of operating such units and devices are not limited to the specific embodiments described herein, but rather, components of systems and/or steps of the methods may be utilized independently and separately from other components and/or steps described herein. For example, the methods may also be used in combination with other systems for ventilating a cavity, and are not limited to practice with only the systems and methods as described herein. Rather, the exemplary embodiment may be implemented and utilized in connection with many other machinery applications that require ventilating a cavity.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ventilation system comprising:
a cavity to be vented, said cavity including different ventilation level requirements for each of a plurality of respective modes of operation;
a fluid motive force device comprising a suction port, an outlet port, a motive fluid inlet port, and a nozzle, said suction port coupled in flow communication with said cavity to be vented, a flow supply to the motive fluid inlet port determining a ventilation flow through the suction port; and
a motive fluid supply system coupled in flow communication with said motive fluid inlet port, wherein the motive fluid supply system is coupled in flow communication with a first aperture and a second aperture,
wherein the first aperture is located at one stage of a compressor and the second aperture is located at another stage of the compressor that is a lower stage than the one stage,
wherein the suction port and the outlet port are connected via an eductor, and the nozzle is provided within the eductor between the suction port and the outlet port and extends into a flow path of the eductor,
wherein the suction port, the outlet port and the nozzle are aligned along a common axis,
wherein the motive fluid inlet port and the nozzle are configured such that motive fluid input through the motive fluid inlet port and output through the nozzle is directed towards the outlet port opposite the suction port to generate fluid suction at the suction port,
wherein an operation of said motive fluid supply system determines a flow of a motive fluid from said motive fluid supply system to said motive fluid inlet port,
wherein the flow of the motive fluid to said motive fluid inlet port generates a ventilation flow through said suction port approximately matching a current ventilation demand of said cavity.

2. The ventilation system of claim 1, wherein said fluid motive force device comprises the eductor.

3. The ventilation system of claim 1, wherein said motive fluid supply system comprises an air management system.

4. The ventilation system of claim 1, wherein said cavity comprises a sump.

5. The ventilation system of claim 1, wherein the nozzle is coupled in flow communication with said motive fluid inlet port.

6. The ventilation system of claim 5 further comprising a first conduit coupled in flow communication with said motive fluid supply system and said motive fluid inlet port, said first conduit configured to channel a flow of the motive fluid from said motive fluid supply system to said motive fluid inlet port.

7. The ventilation system of claim 6,
wherein said first conduit comprises a first valve, and
wherein said first valve is configured in an open position during a first mode of operation to allow flow of motive fluid from the first aperture.

8. The ventilation system of claim 7 further comprising a second conduit coupled in flow communication with said motive fluid supply system and said first conduit, said second conduit configured to channel the flow of motive fluid from said motive fluid supply system to said first conduit.

9. The ventilation system of claim 8,
wherein said second conduit comprises a second valve, and
wherein said second valve is configured in an open position and said first valve configured in a closed position during a second mode of operation to allow flow of motive fluid from the second aperture while shutting off flow of motive fluid from the first aperture.

10. A gas turbine engine comprising:
a core engine comprising a compressor, a combustor, and a turbine in a serial flow arrangement;
a low pressure compressor coupled to a low pressure turbine by a shaft;
a bearing supporting said shaft;
a sump at least partially surrounding said bearing; and
a ventilation system comprising:
a cavity to be vented, said cavity including different ventilation level requirements for each of a plurality of respective modes of operation;
a fluid motive force device comprising a suction port, an outlet port, a motive fluid inlet port, and a nozzle, said suction port coupled in flow communication with said cavity to be vented, a flow supply to the motive fluid inlet port determining a ventilation flow through the suction port; and
a motive fluid supply system coupled in flow communication with said motive fluid inlet port,
wherein the motive fluid supply system is coupled in flow communication with a first aperture and a second aperture,
wherein the first aperture is located at one stage of the compressor and the second aperture is located at another stage of the compressor that is a lower stage than the one stage,
wherein the suction port and the outlet port are connected via an eductor, and the nozzle is provided within the eductor between the suction port and the outlet port and extends into a flow path of the eductor,
wherein the suction port, the outlet port and the nozzle are aligned along a common axis,
wherein the motive fluid inlet port and the nozzle are configured such that motive fluid input through the motive fluid inlet port and output through the nozzle is directed towards the outlet port opposite the suction port to generate fluid suction at the suction port,
wherein an operation of said motive fluid supply system determines a flow of a motive fluid from said motive fluid supply system to said motive fluid inlet port, and
wherein the flow of the motive fluid to said motive fluid inlet port generates a ventilation flow through said suction port approximately matching a current ventilation demand of said cavity.

11. The gas turbine engine of claim 10, wherein said fluid motive force device comprises the eductor.

12. The gas turbine engine of claim 10, wherein said motive fluid supply system comprises an air management system.

13. The gas turbine engine of claim 10, wherein the nozzle is coupled in flow communication with said motive fluid inlet port.

14. The gas turbine engine of claim 13 further comprising a first conduit coupled in flow communication with said motive fluid supply system and said motive fluid inlet port, said first conduit configured to channel a flow of the motive fluid from said motive fluid supply system to said motive fluid inlet port.

15. The gas turbine engine of claim 14,
wherein said first conduit comprises a first valve, and
wherein said first valve is configured in an open position during a first mode of operation to allow flow of motive fluid from the first aperture.

16. The gas turbine engine of claim 15 further comprising a second conduit coupled in flow communication with said motive fluid supply system and said first conduit, said second conduit configured to channel the flow of motive fluid from said motive fluid supply system to said first conduit.

17. The gas turbine engine of claim 16,
wherein said second conduit comprises a second valve, and
said second valve configured in an open position and said first valve configured in a closed position during a second mode of operation to allow flow of motive fluid from the second aperture while shutting off flow of motive fluid from the first aperture.

18. A method of venting a cavity, the method comprising:
channeling a first flow of a motive fluid from a motive fluid inlet port to a nozzle, the first flow determined by an operation of a motive fluid supply system;
generating a suction flow through a suction port of an eductor based on the first flow; and
ventilating the cavity using the suction flow through an outlet port of the eductor, the suction flow substantially matching a demand for ventilation by the cavity,
wherein the nozzle is provided within the eductor between the suction port and the outlet port and extends into a flow path of the eductor,
wherein the suction port, the outlet port and the nozzle are aligned along a common axis,
wherein the first flow of the motive fluid input through the motive fluid inlet port and output through the nozzle is directed towards the outlet port opposite the suction port to generate fluid suction at the suction port,
wherein the motive fluid supply system is coupled in flow communication with a first aperture and a second aperture,
wherein the first aperture is located at one stage of a compressor and the second aperture is located at another stage of the compressor that is a lower stage than the one stage.

19. The method of claim 18, wherein ventilating the cavity using the suction flow, the suction flow substantially matching the demand for ventilation by the cavity comprises ventilating a sump using the suction flow, the suction flow substantially matching a demand for ventilation by the sump.

20. The method of claim 18, wherein channeling the first flow of the motive fluid from the motive fluid inlet port to the nozzle, the first flow determined by an operation of a motive fluid supply system comprises channeling the first flow of the motive fluid to the motive fluid inlet port, the first flow determined by an operation of an air management system.

* * * * *